US009145251B2

(12) United States Patent
Minnette et al.

(10) Patent No.: US 9,145,251 B2
(45) Date of Patent: Sep. 29, 2015

(54) PACKAGE

(71) Applicant: Berry Plastics Corporation, Evansville, IN (US)

(72) Inventors: Jeffrey C Minnette, Evansville, IN (US); Ken Jochem, Mt. Vernon, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

(21) Appl. No.: 14/063,902

(22) Filed: Oct. 25, 2013

(65) Prior Publication Data
US 2014/0117025 A1    May 1, 2014

Related U.S. Application Data

(60) Provisional application No. 61/719,195, filed on Oct. 26, 2012.

(51) Int. Cl.
*B65D 81/18* (2006.01)
*B65D 79/00* (2006.01)
*A23L 3/04* (2006.01)

(52) U.S. Cl.
CPC . *B65D 81/18* (2013.01); *A23L 3/04* (2013.01); *B65D 79/005* (2013.01)

(58) Field of Classification Search
CPC .......... B65D 1/42; B65D 79/005; B65D 1/18; B65D 1/2046; B65D 1/2061; B65D 1/3438
USPC ............. 220/494, 495, 600, 626, 62.22, 609, 220/62.11, 62.12, 62.13, 62.18, 660, 662, 220/668, 9.1, 720, 721, 912, 319
See application file for complete search history.

(56) References Cited

U.S. PATENT DOCUMENTS

| | | | |
|---|---|---|---|
| 1,824,907 | A | 8/1929 | Lermer |
| 2,196,206 | A | 3/1936 | Foss |
| 2,277,066 | A | 2/1938 | Bogner |
| 3,051,580 | A | 12/1958 | Brennan |
| 3,410,939 | A | 11/1968 | Driza et al. |
| 3,428,238 | A | 2/1969 | Shelby et al. |
| 3,447,714 | A | 6/1969 | Elliot |
| 3,452,896 | A | 7/1969 | Elliot |
| 3,452,921 | A | 7/1969 | Donovan |
| 3,463,350 | A | 8/1969 | Unger |
| 3,471,075 | A | 10/1969 | Wolf |
| 3,685,685 | A | 8/1972 | Phillips |
| 3,753,512 | A | 8/1973 | Curry |
| 3,787,547 | A | 1/1974 | Marco |
| 3,923,190 | A | 12/1975 | Roth |
| 3,952,677 | A | 4/1976 | Hartman et al. |
| 3,977,153 | A | 8/1976 | Schrenk |
| 4,120,932 | A | 10/1978 | Roth |
| 4,154,345 | A | 5/1979 | Davis et al. |
| 4,210,674 | A | 7/1980 | Mitchell |
| 4,215,797 | A | 8/1980 | Chen |
| 4,270,475 | A | 6/1981 | Fletcher |
| 4,284,671 | A | 8/1981 | Cancio et al. |
| 4,292,355 | A | 9/1981 | Bonis |
| 4,398,648 | A | 8/1983 | Cerny et al. |

(Continued)

*Primary Examiner* — Fenn Mathew
*Assistant Examiner* — Chetan Chandra
(74) *Attorney, Agent, or Firm* — Barnes & Thornburg LLP

(57) ABSTRACT

A package includes a lid adapted to mate with the brim of a container. An interior chamber of the package is bounded by the container and the lid when the lid is mounted on the container brim.

21 Claims, 12 Drawing Sheets

(56) References Cited

U.S. PATENT DOCUMENTS

| | | |
|---|---|---|
| 4,446,969 A | 5/1984 | Tyler |
| 4,526,290 A | 7/1985 | Cerny |
| 4,542,029 A | 9/1985 | Caner et al. |
| 4,641,005 A | 2/1987 | Seiferth |
| 4,685,273 A | 8/1987 | Caner et al. |
| 4,794,008 A | 12/1988 | Schmidt et al. |
| 4,809,876 A | 3/1989 | Tomaswick et al. |
| 4,859,822 A | 8/1989 | Ragusa et al. |
| 4,880,129 A | 11/1989 | McHenry et al. |
| 4,883,190 A | 11/1989 | Thomas |
| 4,913,307 A | 4/1990 | Takata et al. |
| 4,925,684 A | 5/1990 | Simon |
| 4,927,677 A | 5/1990 | Kasai |
| 4,948,006 A | 8/1990 | Okabe |
| 4,959,446 A | 9/1990 | Davis et al. |
| 4,964,205 A | 10/1990 | Coffman |
| 4,988,841 A | 1/1991 | Pesheck et al. |
| 5,035,344 A | 7/1991 | Christopher |
| 5,039,001 A | 8/1991 | Kinigakis et al. |
| 5,045,369 A | 9/1991 | Kobayashi et al. |
| 5,096,306 A | 3/1992 | Perrson et al. |
| 5,098,751 A | 3/1992 | Tamura et al. |
| 5,176,284 A | 1/1993 | Sorensen |
| 5,176,314 A | 1/1993 | Akazawa et al. |
| 5,217,737 A | 6/1993 | Gygax et al. |
| 5,236,102 A * | 8/1993 | Quittmann et al. ......... 220/23.87 |
| 5,257,709 A * | 11/1993 | Okabe et al. ............... 220/62.22 |
| 5,360,649 A | 11/1994 | Sato et al. |
| 5,428,943 A | 7/1995 | Balcombe |
| 5,429,833 A | 7/1995 | Wyslotsky |
| 5,445,292 A | 8/1995 | Slomski et al. |
| 5,705,239 A | 1/1998 | Andersen et al. |
| 5,782,376 A | 7/1998 | Brauner et al. |
| 5,843,501 A | 12/1998 | Rubin et al. |
| 5,928,741 A | 7/1999 | Andersen et al. |
| 5,971,259 A | 10/1999 | Bacon |
| 6,022,913 A | 2/2000 | Tanaka et al. |
| 6,032,819 A | 3/2000 | Hanna |
| 6,065,628 A | 5/2000 | Page |
| 6,077,578 A | 6/2000 | Valyi |
| 6,138,854 A | 10/2000 | Kaneko et al. |
| 6,158,608 A | 12/2000 | Schlattl |
| 6,170,696 B1 | 1/2001 | Tucker et al. |
| 6,189,744 B1 | 2/2001 | Prince |
| 6,257,401 B1 | 7/2001 | Mangla et al. |
| 6,279,505 B1 | 8/2001 | Plester et al. |
| 6,296,137 B1 | 10/2001 | Bjørnsen |
| 6,305,546 B1 | 10/2001 | Saunders et al. |
| 6,320,172 B1 | 11/2001 | Watkins |
| 6,325,213 B1 | 12/2001 | Landis |
| 6,363,695 B1 | 4/2002 | Mykkänen |
| 6,375,023 B1 | 4/2002 | Lecinski et al. |
| 6,390,323 B1 | 5/2002 | Alticosalian |
| 6,399,170 B1 | 6/2002 | Hock et al. |
| 6,413,466 B1 | 7/2002 | Boyd et al. |
| 6,460,714 B1 | 10/2002 | Silvers et al. |
| 6,460,720 B1 | 10/2002 | Massey et al. |
| 6,521,158 B2 | 2/2003 | Ichikawa et al. |
| 6,554,154 B1 | 4/2003 | Chauhan et al. |
| 6,588,654 B2 | 7/2003 | Nakashima |
| 6,627,278 B1 | 9/2003 | Sandstrom et al. |
| 6,648,164 B1 | 11/2003 | DeCola et al. |
| 6,651,874 B1 | 11/2003 | Pedersen |
| 6,672,473 B2 | 1/2004 | Torniainen et al. |
| 6,673,403 B1 | 1/2004 | Shiiki et al. |
| 6,682,764 B1 | 1/2004 | Morris et al. |
| 6,685,049 B1 | 2/2004 | Paladino |
| 6,699,543 B1 | 3/2004 | Agarwal |
| 6,712,232 B2 | 3/2004 | Tanaka et al. |
| 6,718,664 B2 | 4/2004 | Williams |
| 6,722,518 B1 | 4/2004 | Bartz |
| 6,729,494 B2 | 5/2004 | Portman et al. |
| 6,729,495 B2 | 5/2004 | Gardiner |
| 6,763,962 B1 | 7/2004 | Wang |
| 6,763,968 B1 * | 7/2004 | Boyd et al. .................... 220/608 |
| 6,808,753 B2 | 10/2004 | Rule et al. |
| 6,811,826 B2 | 11/2004 | Rule et al. |
| 6,868,980 B2 | 3/2005 | Schultz et al. |
| 6,870,145 B2 | 3/2005 | Watkins |
| 6,874,650 B2 | 4/2005 | Welsh et al. |
| 6,881,286 B2 | 4/2005 | Drummond et al. |
| 6,905,769 B2 | 6/2005 | Komada |
| 6,910,599 B2 | 6/2005 | Tucker et al. |
| 6,919,135 B2 | 7/2005 | Kasahara |
| 6,949,275 B2 | 9/2005 | Johansson |
| 6,960,316 B2 | 11/2005 | Brown et al. |
| 7,000,801 B2 | 2/2006 | Rodriguez |
| 7,004,345 B2 | 2/2006 | Turner et al. |
| 7,017,773 B2 * | 3/2006 | Gruber et al. ................. 220/675 |
| 7,022,955 B2 | 4/2006 | Watkins |
| 7,090,880 B1 | 8/2006 | Droste et al. |
| 7,097,063 B2 | 8/2006 | Tucker et al. |
| 7,097,066 B2 | 8/2006 | Tucker et al. |
| 7,112,356 B2 | 9/2006 | Nomula et al. |
| 7,118,800 B2 | 10/2006 | Shirane et al. |
| 7,122,234 B2 | 10/2006 | Olofsson et al. |
| 7,128,233 B2 | 10/2006 | Hogan |
| 7,131,289 B2 | 11/2006 | Harl et al. |
| 7,137,524 B2 | 11/2006 | Nomula |
| 7,137,525 B2 | 11/2006 | Gibney |
| 7,178,687 B1 | 2/2007 | Manderfield et al. |
| 7,195,803 B2 | 3/2007 | Andersson et al. |
| 7,198,168 B2 | 4/2007 | Mizuma |
| 7,204,056 B2 | 4/2007 | Sieverding |
| 7,216,769 B2 | 5/2007 | Palder |
| 7,246,714 B2 | 7/2007 | Garg et al. |
| 7,261,219 B2 | 8/2007 | Tucker et al. |
| 7,284,673 B2 | 10/2007 | Habeger et al. |
| 7,306,852 B2 | 12/2007 | Komada |
| 7,337,916 B2 | 3/2008 | Clougherty |
| 7,370,788 B1 | 5/2008 | Otani et al. |
| 7,371,455 B2 | 5/2008 | Shirane et al. |
| 7,437,990 B2 | 10/2008 | Duch |
| 7,458,480 B2 | 12/2008 | Nguyen |
| 7,458,500 B2 | 12/2008 | Whitaker et al. |
| 7,475,787 B2 | 1/2009 | Gruver et al. |
| 7,476,428 B2 | 1/2009 | Bürki et al. |
| 7,543,705 B2 * | 6/2009 | Yourist ........................ 206/519 |
| 7,543,713 B2 | 6/2009 | Trude et al. |
| 7,549,540 B2 | 6/2009 | Lee et al. |
| 7,552,841 B2 | 6/2009 | Hollis et al. |
| 7,556,168 B2 | 7/2009 | Turner et al. |
| 7,563,495 B2 * | 7/2009 | Anelli ........................ 428/34.6 |
| 7,568,590 B1 | 8/2009 | Gross et al. |
| 7,571,827 B2 * | 8/2009 | Haley et al. .................. 215/381 |
| 7,584,866 B2 | 9/2009 | Selina et al. |
| 7,631,777 B1 | 12/2009 | Bukowski |
| 7,644,823 B2 | 1/2010 | Gelardi et al. |
| 7,644,833 B2 | 1/2010 | Turner et al. |
| 7,651,651 B2 | 1/2010 | Riffer |
| 7,665,601 B2 | 2/2010 | Portier |
| 7,665,623 B2 | 2/2010 | Emmerzaal |
| 7,681,732 B2 | 3/2010 | Moehlenbrock et al. |
| 7,694,843 B2 | 4/2010 | Hollis et al. |
| 7,699,216 B2 * | 4/2010 | Smith et al. .................... 229/403 |
| 7,726,483 B2 | 6/2010 | Ramanujam et al. |
| 7,735,674 B2 | 6/2010 | Cai |
| 7,748,553 B2 | 7/2010 | Akiyama et al. |
| 7,757,885 B2 | 7/2010 | Goeking et al. |
| 7,757,887 B2 | 7/2010 | Gardiner |
| 7,766,168 B2 | 8/2010 | Thrapp et al. |
| 7,766,178 B2 | 8/2010 | Robinson et al. |
| 7,766,181 B2 | 8/2010 | Fogle et al. |
| 7,789,262 B2 | 9/2010 | Niederer et al. |
| 7,794,149 B2 | 9/2010 | Wilkes |
| 7,799,400 B2 | 9/2010 | Zihlmann |
| 7,823,737 B2 | 11/2010 | Noll et al. |
| 7,824,749 B2 | 11/2010 | Dawes |
| 7,861,881 B2 | 1/2011 | Ali et al. |
| 7,862,318 B2 | 1/2011 | Middleton et al. |
| 7,866,536 B2 | 1/2011 | Calendrille |
| 7,874,453 B2 | 1/2011 | Church |
| 7,874,476 B2 | 1/2011 | D'Amato |
| 7,878,350 B2 | 2/2011 | Ramoundos |

(56) References Cited

U.S. PATENT DOCUMENTS

| | | |
|---|---|---|
| 7,882,975 B2 | 2/2011 | Kelly |
| 7,886,937 B2 | 2/2011 | Py |
| 7,913,874 B2 | 3/2011 | Gruskin et al. |
| 7,919,161 B2 | 4/2011 | Ebner et al. |
| 7,922,021 B2 | 4/2011 | Golden |
| 7,954,640 B2 | 6/2011 | West et al. |
| 7,959,038 B2 | 6/2011 | de Oliveira et al. |
| 7,963,419 B2 * | 6/2011 | Burney et al. ................ 220/780 |
| 7,980,403 B2 | 7/2011 | Martinez |
| 7,980,404 B2 | 7/2011 | Trude et al. |
| 7,984,807 B2 | 7/2011 | Elliott |
| 8,002,170 B2 | 8/2011 | Dixon-Garrett et al. |
| 8,038,023 B2 | 10/2011 | Moore et al. |
| 8,113,368 B2 * | 2/2012 | Oguchi et al. ................ 215/381 |
| 8,733,572 B2 * | 5/2014 | Ruiz Carmona .......... 220/23.83 |
| 2004/0185152 A1 | 9/2004 | Garwood |
| 2004/0185154 A1 | 9/2004 | Garwood |
| 2004/0185155 A1 | 9/2004 | Garwood |
| 2004/0185156 A1 | 9/2004 | Garwood |
| 2004/0232026 A1 | 11/2004 | Goeking et al. |
| 2005/0031814 A1 | 2/2005 | Dawes |
| 2005/0074531 A1 | 4/2005 | Patterson |
| 2005/0077297 A1 | 4/2005 | Marshburn et al. |
| 2005/0084695 A1 | 4/2005 | Shirane et al. |
| 2005/0158494 A1 | 7/2005 | Koyama et al. |
| 2005/0175741 A1 | 8/2005 | Reinders |
| 2005/0211713 A1 | 9/2005 | Goeking et al. |
| 2005/0284171 A1 | 12/2005 | Harl et al. |
| 2006/0029757 A1 | 2/2006 | Komada |
| 2006/0051463 A1 | 3/2006 | Lopez |
| 2006/0191940 A1 | 8/2006 | Heyn |
| 2006/0204695 A1 | 9/2006 | Shirane et al. |
| 2006/0269767 A1 | 11/2006 | Sankey et al. |
| 2007/0267374 A1 | 11/2007 | Middleton et al. |
| 2008/0078766 A1 | 4/2008 | Oberholzer |
| 2009/0081336 A1 | 3/2009 | Tuszkiewicz et al. |
| 2009/0110784 A1 | 4/2009 | Yasumuro et al. |
| 2009/0302040 A1 | 12/2009 | Fox et al. |
| 2010/0108693 A1 | 5/2010 | Zhang et al. |
| 2010/0176134 A1 | 7/2010 | Cramer |
| 2010/0237069 A1 | 9/2010 | Helou et al. |
| 2010/0237083 A1 | 9/2010 | Trude et al. |
| 2011/0253713 A1 | 10/2011 | Ichikawa et al. |
| 2012/0199599 A1 | 8/2012 | Minnette et al. |
| 2013/0292394 A1 | 11/2013 | Minnette et al. |

* cited by examiner

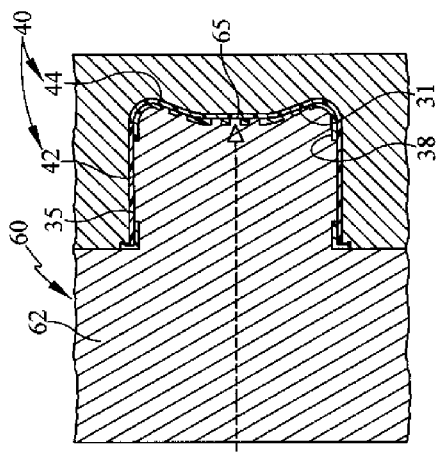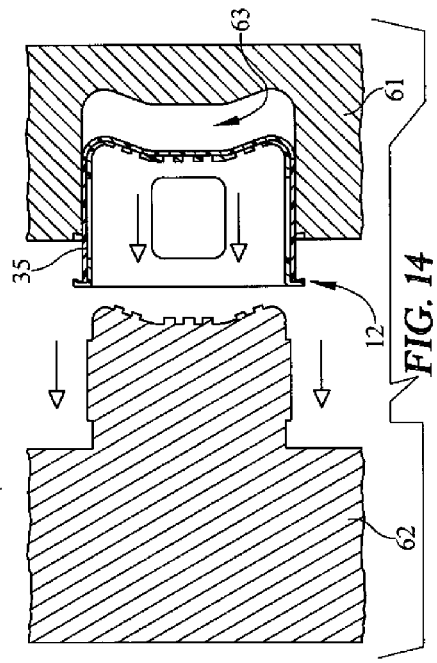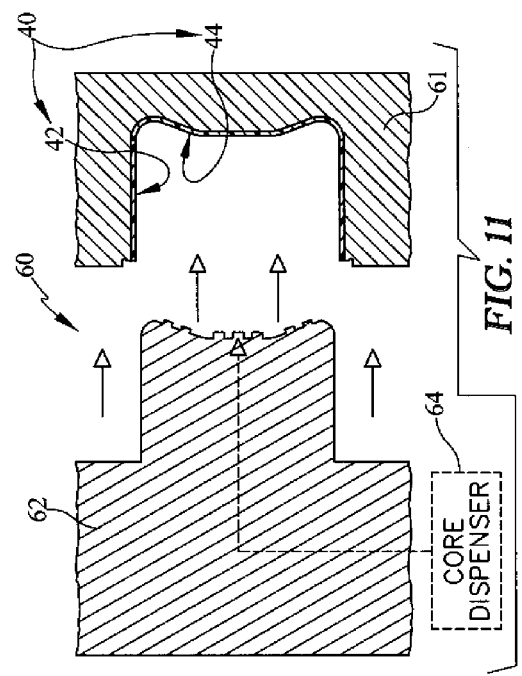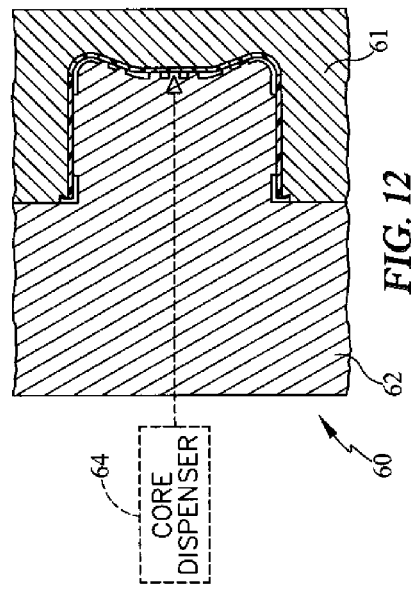
FIG. 11
FIG. 12
FIG. 13
FIG. 14

PACKAGE

PRIORITY CLAIM

This application claims priority under 35 U.S.C. §119(e) to U.S. Provisional Application Ser. No. 61/719,195, filed Oct. 26, 2012, which is expressly incorporated by reference herein.

BACKGROUND

The present disclosure relates to a package, and in particular to a package including a container and a lid for the container. More particularly, the present disclosure relates to a package that can survive exposure to temperature variations.

SUMMARY

A package in accordance with the present disclosure includes a lid adapted to mate with the brim of a container to close an opening into an interior product-storage region formed in the container. In illustrative embodiments, the package is configured to store food in an interior chamber bounded by the container and lid when the lid is mounted on the container brim.

In illustrative embodiments, the package can expand and contract in size without bursting during exposure of the package to increased temperature, for example, to high temperatures in an oven for several minutes at high pressure to sterilize food stored in the package. The container includes a vessel encased in an exterior casing made of an expansible elastic material that expands and contracts during exposure of the package to pressure and temperature changes.

In illustrative embodiments, the exterior casing can provide one or more of a support web for the vessel, a substrate for printed graphics for the vessel, and an oxygen-barrier shield for the vessel. The vessel and exterior casing are made of food-grade polypropylene or other suitable polymeric material or film. The vessel is formed to include a lip that functions as the brim of the container and is adapted to mate with the lid.

In illustrative embodiments, the vessel is also formed to include side and bottom panels that cooperate to form an interior product-storage region located below the lip. The interior product-storage region of the container is bounded by the vessel and by the sleeve and base portions of the exterior casing and is adapted for receiving and holding liquid and solid food until the lid is mounted on the container to produce a package that can store food during, for example, a food sterilization (retort) process or exposure to other temperature and pressure conditions leading to increased pressure in the interior product storage region of the package.

In illustrative embodiments, the side panel of the vessel is formed to include windows that extend through the side panel to open into the interior product-storage region. A sleeve of the exterior casing covers the windows formed in the side panel of the vessel. The sleeve of the exterior casing can expand and contract without bursting when exposed (via the side-panel windows) to high temperatures and pressures during, for example, a food sterilization (retort) process for the package or exposure to other temperature and pressure conditions leading to increased pressure in the interior product-storage region of the package.

In illustrative embodiments, the bottom panel of the vessel is illustratively formed to include a plurality of apertures arranged in a predetermined pattern that extend through the bottom panel to open into the interior product-storage region. The base of the exterior casing covers the plurality of apertures formed in the bottom panel of the vessel. The base of the exterior casing can also expand and contract without bursting when exposed to high temperatures and pressures.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 10-14 show an illustrative process for forming the package of FIGS. 1-4 in a mold;

FIG. 10 is a diagrammatic and perspective view showing a lower mold portion formed to include a female mold cavity and insertion of a strip made of film and a disk made of film into the mold cavity during a first molding stage;

FIG. 11 is a sectional view of a plastics injection mold after the film disk and strip have been deposited in the female mold cavity of the lower mold portion prior to movement of a companion upper mold portion toward the lower mold portion;

FIG. 12 is a view similar to FIG. 13 after the upper and lower mold portions have been moved to assume closed positions forming a mold cavity containing the film disk and strip prior to injection of plastics material into the mold cavity by a core dispenser coupled to the plastics injection mold;

FIG. 13 is a view similar to FIG. 14 after the core dispenser has injected molten plastics material into the mold cavity filling the mold cavity to form the vessel and coupling the film disk to the film strip to form the exterior casing surrounding the vessel;

FIG. 14 is a view similar to FIG. 15 after the companion upper mold portion has moved away from the lower female mold cavity and the completed container is being removed from the lower female mold cavity;

DETAILED DESCRIPTION

Figure 1:
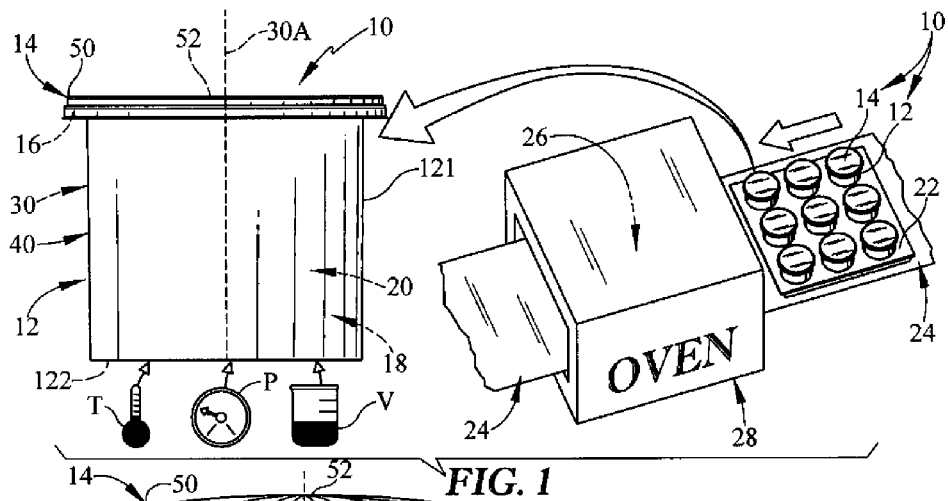
FIG. 1 is a diagrammatic view showing a tray carrying nine retortable packages in accordance with a first embodiment of the present design and moving along a conveyor toward an oven and showing an enlarged side elevation view of one of those retortable packages before it is heated and pressurized in the oven as suggested in FIG. 2 and showing that the package comprises a lid mounted on a brim of a container.

A package 10 in accordance with the present disclosure includes a lid 14 and a container 12 having a side wall 121 and a floor 122 as suggested in FIGS. 1-4. Lid 14 is adapted to be mounted on a brim 16 of container 12 to form an interior chamber 18 of package 10 as suggested in FIGS. 1 and 6. In illustrative embodiments, portions of lid 14 and container 12 are made of an expansible elastic material and have pre-expansion shapes as suggested in FIGS. 1 and 5. Those lid and container portions also expand without bursting when the pressure in interior chamber 18 increases during exposure of package 10 to high temperatures to assume inflated shapes shown, for example, in FIG. 2. Further embodiments are shown in FIGS. 15-18.

Figure 2:
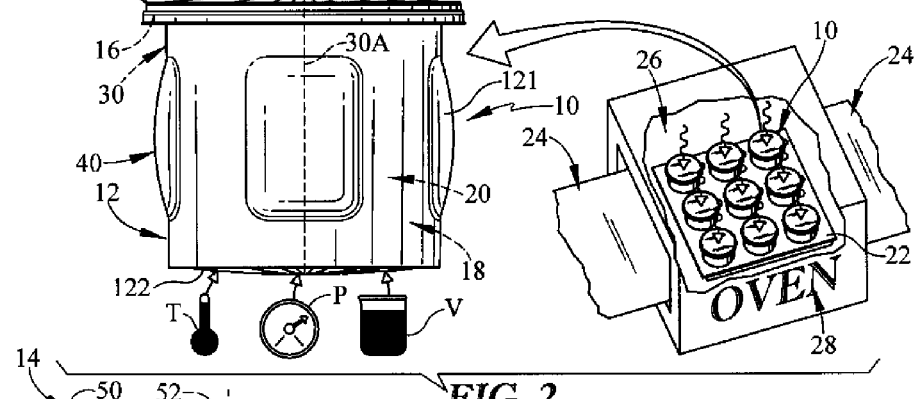
FIG. 2 is a view similar to FIG. 1 showing that the tray has moved into a hot oven to heat each of the nine retortable packages and an enlarged side elevation view of the retortable package that was singled out and shown in FIG. 1 and showing that an expansible elastic membrane sheet of the lid included in the retortable package shown in FIG. 1 expands upwardly, an expansible elastic exterior casing made of film and included in the side wall of the container included in the package expands radially outwardly, and an expansible elastic floor of the container included in the package expands downwardly during exposure of the package to high temperatures in an oven leading to an increase in pressure in the interior chamber formed in the package during sterilization of the contents of the package to increase the volume of the product-storage region provided in the package without bursting or damaging the package even though the pressure inside the package increased when the package was heated.
Figure 3:
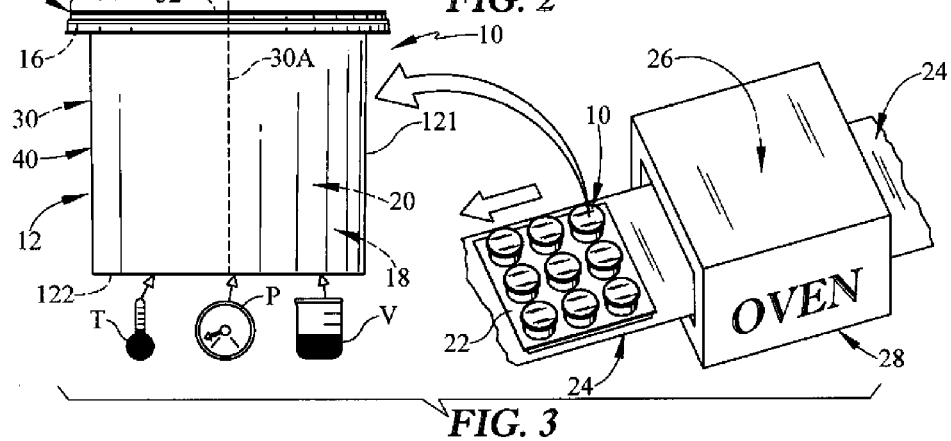
FIG. 3 is a view similar to FIGS. 1 and 2 showing that each of the expansible elastic membrane sheets of the lid, the expansible elastic exterior casing of the container side wall, and the expansible elastic container floor contracts in size when cooled after discharge from the oven to assume the original pre-expansion shapes shown in FIG. 1.

As suggested in FIGS. 1-3, package 10 is heated and then cooled during a retort process to sterilize contents 20 stored in interior chamber 18 of package 10. The expansible elastic portions (e.g., membrane sheet 52 in lid 14, sleeve 42 in exterior casing 40 in container side wall 121, and container floor 122) expand as suggested in FIG. 2 to assume inflated shapes when package 10 is heated to increase pressure in interior chamber 18 and contract to return to the pre-expansion shapes when package 10 is later cooled as suggested in FIGS. 3 and 5 to decrease pressure in interior chamber 18 without bursting or damaging package 10. Package 10 is configured to expand and contract in accordance with the present disclosure without bursting when exposed to other temperature conditions leading to increased pressure in interior chamber 18 of package 10.

In an illustrative process shown diagrammatically in FIGS. 1-3, nine retortable packages 10 are placed on a tray 22 moving on a conveyor 24 through a heating chamber 26 formed in an oven 28 (e.g., retort or autoclave machine). Each package 10 is heated in heating chamber 26, causing the temperature (as measured by thermometer T) and pressure (as measured by pressure gauge P) in interior chamber 18 of each package 10 to increase and inflate predetermined portions of container 12 and lid 14 and thereby increase volume of interior chamber 18 (as measured by volume gauge V) in accordance with the present disclosure. Each package 10 then exits heating chamber 26 as tray 22 moves on conveyor 24 out of and away from oven 28 to allow each package 10 to cool and the pressure in interior chamber 18 of each package 10 to decrease. As the pressure in interior chamber 18 of package 10 decreases, the predetermined expansible elastic portions of lid 14 and container 12 deflate and contract so as to move to assume their pre-expansion shapes and the temperature, pressure, and volume in interior chamber 18 of package 10 return to the original pre-expansion states.

Package 10 in accordance with the present disclosure is well-suited for use with hot-filled non-barrier containers used to store food. It may also be used with barrier, retortable containers. Sustainability is enhanced because the container 12 and lid 14 included in package 10 are made of like materials without the inclusion of metal rings or other non-plastics materials in illustrative embodiments.

Figure 4:
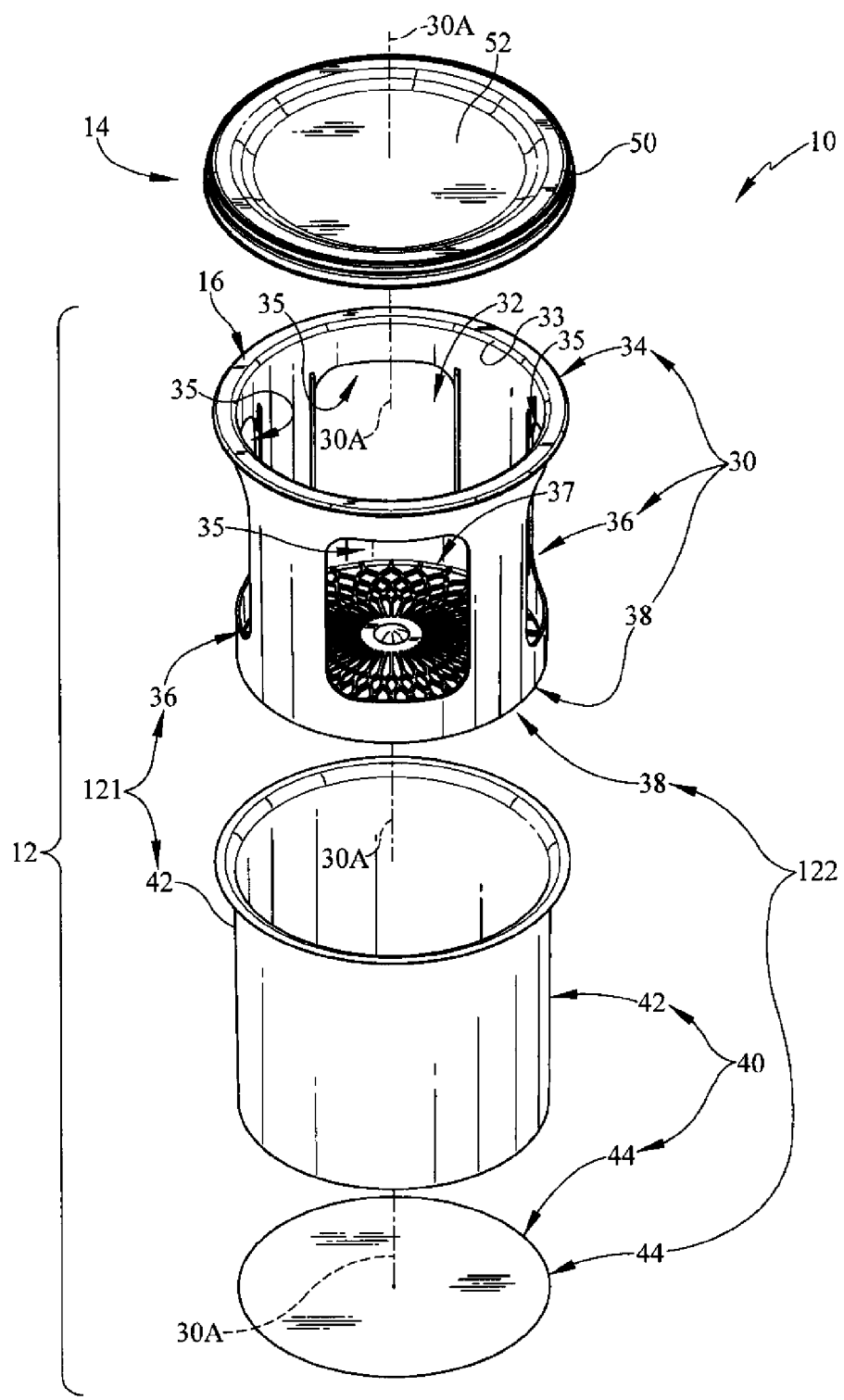
FIG. 4 is an exploded diagrammatic perspective view showing components included in the package of FIG. 1 (after they have been disassembled for purposes of this illustration) and showing, from top to bottom, a lid including an expansible elastic membrane sheet and a surrounding sheet-support ring, and a container comprising (1) a vessel including an annular lip arranged to provide a brim of the container, a side panel with a plurality of windows extending through the side panel, and a floor with a plurality of apertures extending through the floor in a predetermined pattern and (2) an exterior casing including a cylindrical sleeve and a round base under the sleeve.

Illustrative components used to create package 10 are shown in FIG. 4. Container 12 includes a vessel 30 and an exterior casing 40 made of an expansible elastic material. Exterior casing 40 is coupled to exterior surfaces of vessel 30 to produce container 12 as suggested in FIGS. 4 and 8.

Lid 14 includes a sheet-support ring 50 made of a sturdy material and a membrane sheet 52 made of an expansible elastic material as suggested in FIGS. 4-7. Membrane sheet 52 is coupled permanently to sheet-support ring 50 to move therewith relative to container 12 as suggested in FIG. 6. Reference is hereby made to U.S. application Ser. No. 13/362,953, filed Jan. 31, 2012, which application is hereby incorporated herein in its entirety, for disclosure relating to the structure, function, and operation of lid 14.

Vessel 30 is formed to include a product-storage region 32 and an annular lip 34 bordering an opening 33 into product-storage region 32 as suggested in FIG. 4. Vessel 30 also includes an annular side panel 36 coupled to annular lip 34 and a bottom panel 38 coupled to a lower portion of side panel 36 to cooperate therewith to form product-storage region 32. Bottom panel 38 of vessel 30 is made of an expansible elastic material. Vessel 30 is monolithic in an illustrative embodiment. Annular lip 34 of vessel 30 functions as brim 16 of container 12 in an illustrative embodiment. Lid 14 is adapted to mate with brim 16 of container 12 to close the opening 33 into product-storage region 32 formed in vessel 30 as suggested in FIG. 6. Brim 16 and annular side panel 36 are arranged to extend around a vertical central axis 30A of vessel 30 that intersects bottom panel 38 as suggested in FIGS. 1-5 and 8.

Side panel 36 of vessel 30 is formed to include four windows 35 that extend through side panel 36 and open into product-storage region 32 in an illustrative embodiment as shown in FIG. 4. In the illustrated embodiment, four rectangular windows 35 are provided with rounded corners and are equidistantly spaced around the circumference of the annular side panel 36. In the illustrative embodiment, windows 35 are shaped and arranged to influence the expanded shape of side wall 121 and/or the area of exterior casing 40 that is in contact with food 20 stored in product-storage region 32 of package 10 when package 10 is heated during processing. In other illustrative embodiments, there may be various numbers of windows of various shapes and sizes.

Bottom panel 38 of vessel 30 is formed to include a plurality of apertures 37 that extend through the bottom panel 38 to open into product-storage region 32 and are arranged in a predetermined pattern as shown in an illustrative embodiment provided in FIG. 4. In the illustrated embodiment, apertures 37 are shaped and arranged to influence the expanded shape of floor 122 and/or the area of exterior casing 40 that is in contact with food 20 stored in product-storage region 32 of package 10 when package 10 is heated during processing.

Exterior casing 40 is made of an expansible elastic material. It is within the scope of the present disclosure to provide the exterior casing with any suitable shape to conform to the shape of the companion vessel to form a container.

Exterior casing 40 is, for example, an elastic barrier film in accordance with the present disclosure which illustratively includes one or more layers. In one example, exterior casing 40 includes a first layer, a second layer spaced apart from the first layer, and a barrier layer located therebetween. The first layer may be made from polypropylene, nylon, polyethylene terephthalate, combinations of the foregoing, or any other suitable material. The second layer may be made from polyethylene so as to bond with containers made from polyethylene. However, any other suitable material may be used for the second layer. The barrier layer may be an EVOH layer, a metallic layer, an AlOx coated polyethylene terephthalate layer, or any other suitable materials. In another example, the barrier layer may include one or more sub-layers which may include an EVOH layer, a metallic layer, an AlOx coated polyethylene terephthalate layer, one or more tie layers, one or more adhesive layers, and combinations of the foregoing. In yet another example, exterior casing 40 may further include an ink layer. The ink layer may be printed on the first layer so that the ink layer is visible to a consumer. In one example, the ink layer may be printed on an inner surface of the first layer which is arranged to face toward the barrier layer. In another example, the ink layer may be printed on an outer surface arranged to face away from the barrier layer.

Figure 6:
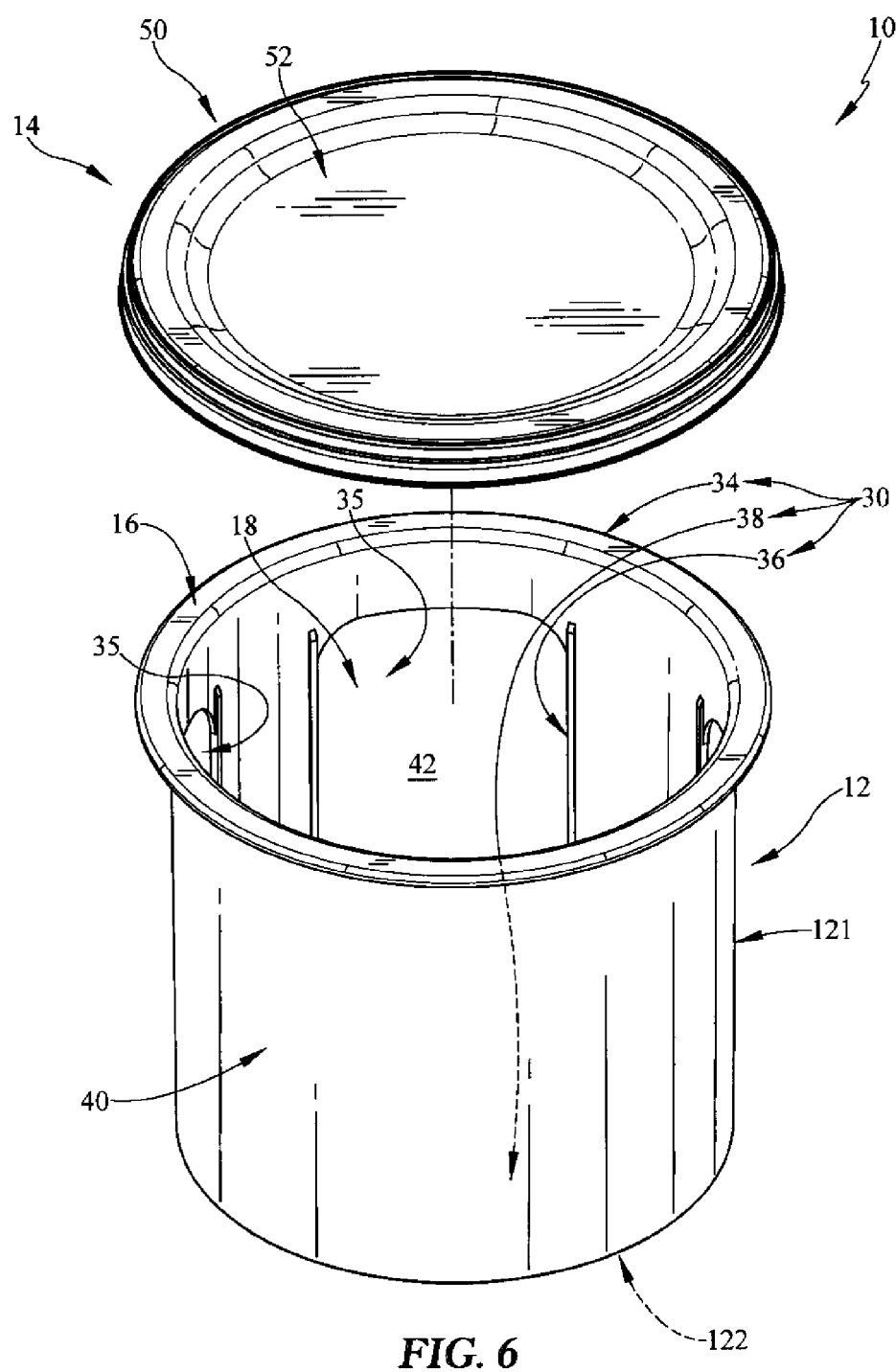
FIG. 6 is an enlarged perspective view of the package of FIG. 5 with the lid removed showing that the vessel is encased in the exterior casing so that a cylindrical sleeve included in the exterior casing covers the windows formed in the side panel of the vessel to close the interior product-storage region of the container.
Figure 7:
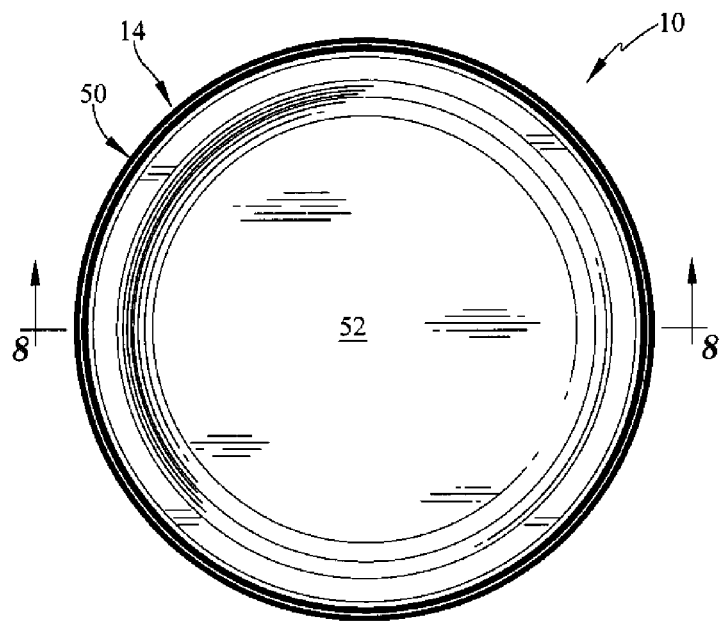
FIG. 7 is an enlarged top plan view of the package of FIG. 1 and including components shown in FIG. 4.
Figure 8:
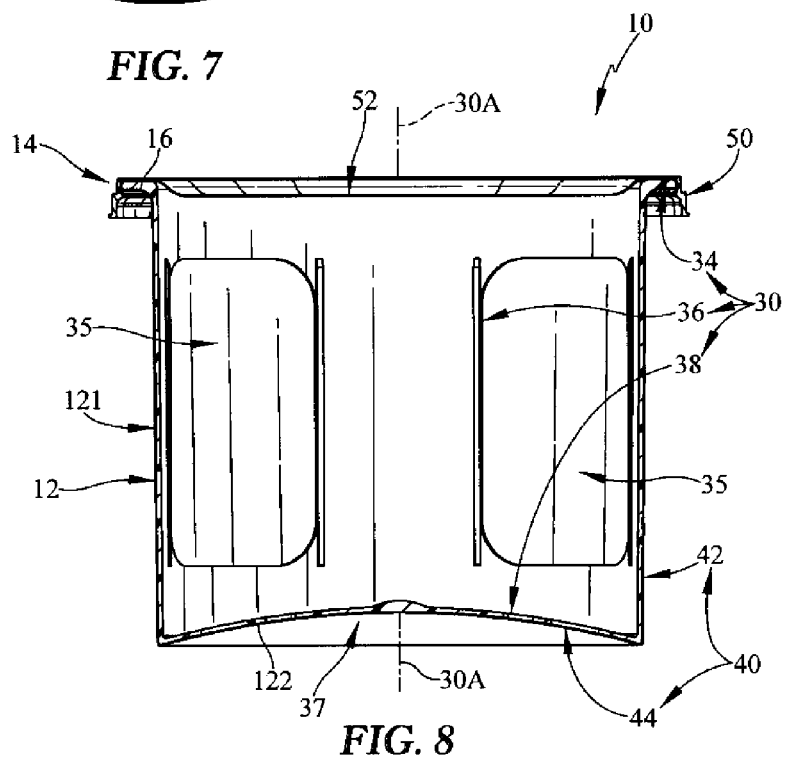
FIG. 8 is a sectional view taken along line 8-8 of FIG. 7 showing that the vessel is encased in the exterior casing to form a container coupled to the lid and showing that each of the expansible elastic sheet membranes included in the lid and the expansible elastic floor included in the container are configured to assume illustrative pre-expansion shapes in which the sheet membrane has a concave outer surface and the floor also has a concave outer surface.
Figure 9:
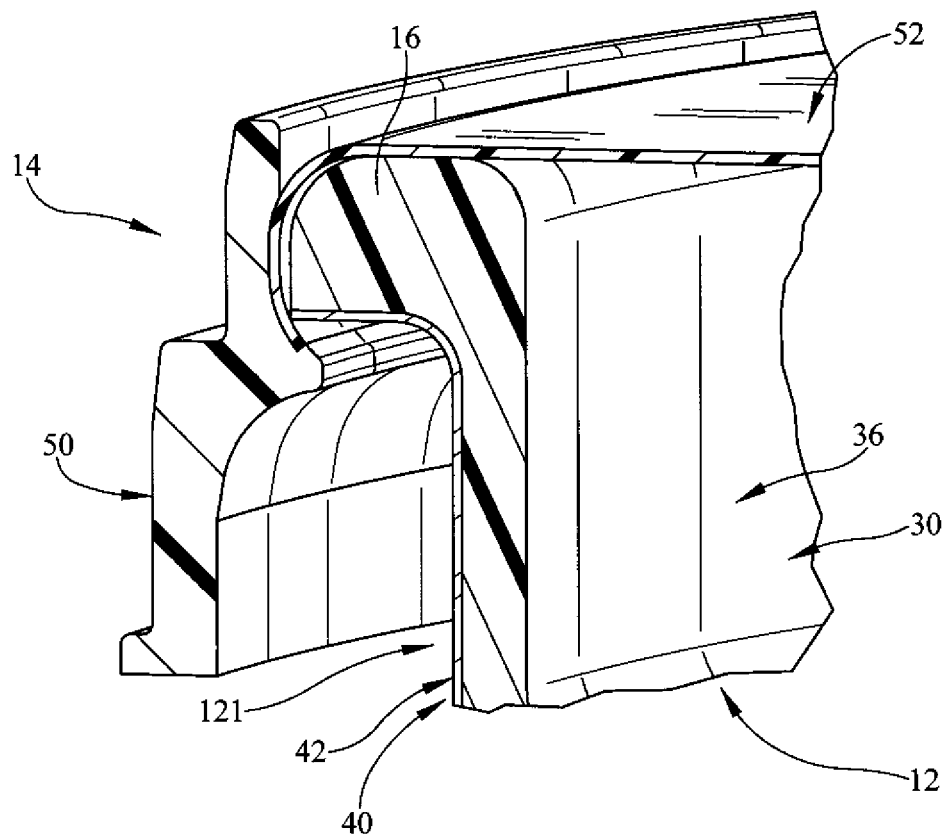
FIG. 9 is an enlarged partial perspective view after the lid has been mounted on the brim showing mating engagement of a portion of the membrane sheet and the brim.

In illustrative embodiments, exterior casing 40 includes a cylindrical sleeve 42 adapted to mate with an exterior surface of vessel side panel 36 to form side wall 121 of container 12 and a base 44 adapted to mate with an exterior surface of vessel bottom panel 38 to form floor 122 of container 12 as suggested in FIG. 4. Sleeve 42 covers windows 35 formed in side panel 36 of vessel 30 as shown in FIGS. 6 and 8. Base 44 covers apertures 37 formed in bottom panel 38 of vessel 30 as suggested in FIGS. 4 and 8. Thus, product-storage region 32 of the container 12 is bounded by exterior casing 40 and is adapted for receiving and holding liquid and solid food 20 until lid 14 is mounted on container 12 to produce a package 10 that can store food 20 in a retort process as suggested in FIGS. 1-3.

In an illustrative process, sleeve 42 and base 44 are joined together when heated to produce the exterior casing 40 and the vessel 30 is formed in a mold cavity 63 containing exterior casing 30 using insert-molding techniques as suggested in FIGS. 10-14 to produce a container 12 in which the exterior casing 40 is coupled to exterior surfaces of the vessel 30 as suggested in FIGS. 4-8. In an illustrative process suggested in FIGS. 10-14, a disk 44D is placed in a mold cavity 63 formed in a female mold 61 during an insert-molding manufacturing process to produce a base 44 and a strip 42S is also inserted into mold cavity 63 and formed during that same manufacturing process to produce a sleeve 42. Sleeve 42 is joined to base 44 during that same manufacturing process to produce an exterior casing 40 that is mated to exterior surfaces of side and bottom panels 36, 38 of vessel 30 as vessel 30 is insert-molded in a mold cavity 63 containing strip 42S and disk 44D. One end 421 of strip 42S is arranged to overlap a second end 422 of strip 42S as suggested in FIG. 4 to produce sleeve 42. Base 44 has a shape matched to the exterior shape of vessel bottom panel 38 and is made of an expansible elastic material. Sleeve 42 and base 44 are made of the same expansible elastic material in an illustrative embodiment. It is within the scope of the present disclosure to use an exterior casing comprising a sleeve or a base or a sleeve and a base.

Depending upon the package application, exterior casing 40 can play one or more of the following roles when coupled to vessel 30 to produce a container 12 in accordance with the present disclosure. Exterior casing 40 can provide a support web to rigidify all or part of vessel 30 to allow portions of vessel 30 to be made of thin non-rigid materials. Exterior casing 40 can provide a substrate for printed graphics on vessel 30. Exterior casing 40 can provide an oxygen-barrier shield to provide means for blocking flow of oxygen into product-storage region 32 through vessel 30.

Figure 5:
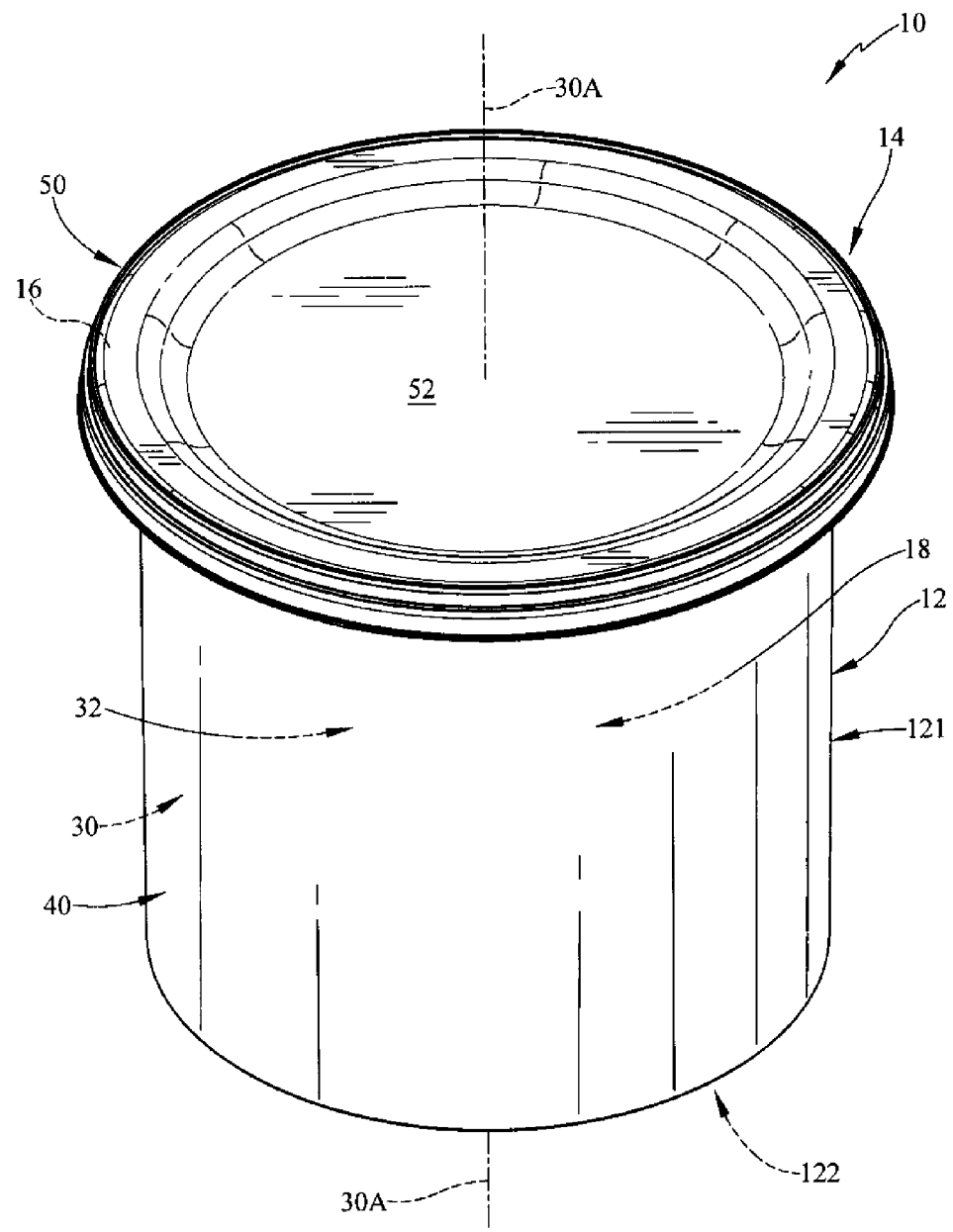
FIG. 5 is an enlarged perspective view of the package of FIG. 1 showing the expansible elastic membrane sheet of the lid and the expansible elastic exterior casing of the side wall of the container prior to heating of the package during sterilization of the package and food stored in the package.

Container 12 includes a side wall 121 and a floor 122 coupled to a lower edge of side wall 121 as suggested in FIGS. 5, 6, and 8. Side wall 121 is arranged to interconnect brim 16 and floor 122. In illustrative embodiments, side panel 36 of vessel 30 is coupled to cylindrical sleeve 42 of exterior casing 40 to form the container side wall 121 and bottom panel 38 of vessel 30 is coupled to round base 44 of exterior casing 40 to form container floor 122. Container side wall 121 is expansible and elastic and configured to move from a substantially cylindrical pre-expansion shape shown in FIGS. 1 and 6 to the outwardly extending inflated shape with relatively greater outwardly extending bulges corresponding to each of the windows 35 formed in vessel 30 as shown, for example, in FIG. 2 in response to an increase in pressure in interior chamber 18 of package 10. Container floor 122 is expansible and elastic and configured to move from the upwardly extending pre-expansion shape (surrounded in part by side wall 121) shown in FIG. 8 to the outwardly extending inflated shape (extended away from lid 14) shown in FIG. 2 in response to an increase in pressure in interior chamber 18 of package 10.

Package 10 in accordance with the present disclosure includes a container 12 and a lid 14 configured to mate with container 12 to close an opening 33 into a product-storage region 32 formed in vessel 30 as suggested in FIGS. 1-6. Container 12 comprises vessel 30 including bottom panel 38 and side panel 36 extending upwardly from bottom panel 38 to form product-storage region 32 and exterior casing 40 is configured to encase vessel 30. Bottom panel 38 is formed to include apertures 37 that are covered by exterior casing 40 and side panel 36 is formed to include windows 35 that are covered by exterior casing 40 so that container 12 is sealed when vessel 30 and exterior casing 40 are assembled.

In illustrative embodiments, exterior casing 40 includes a sleeve 42 made of film and a base 44 also made of film and coupled to a lower end of sleeve 42 as suggested in FIGS. 4 and 8. Base 44 is arranged to mate with the underside of bottom panel 38 of vessel 30 and is sized to correspond to the size of bottom panel 38 so that base 44 covers apertures 37 formed in bottom panel 38 when container 12 is assembled. Sleeve 42 extends up from base 44 and is sized to correspond to the size of side panel 36 so that sleeve 42 covers windows 35 formed in side panel 36 when container 12 is assembled.

In illustrative embodiments, lid 14 comprises a sheet-support ring 50 configured to mate with a brim 16 of container 12 as suggested in FIGS. 4-6 and a membrane sheet 52 coupled permanently to the sheet-support ring 50 to move therewith whenever lid 14 is moved relative to container brim 16. Membrane sheet 52 is a barrier material that is configured to mate with container brim 16 to establish a fluid seal therebetween when lid 14 is mounted on container brim 16 at a factory.

In illustrative embodiments, membrane sheet 52 provides a barrier lidstock and is anchored to the surrounding sheet-support ring 50 to form lid 14. It is within the scope of this disclosure to use insert-molding techniques to overmold sheet-support ring 50 onto the multi-layer membrane sheet 52 to form lid 14. In illustrative embodiments, membrane sheet 52 is bonded permanently to sheet-support ring 50.

Membrane sheet 52 of lid 14 is expansible and elastic and configured to move from the inwardly extending pre-expansion shape (surrounded in part by side wall 121) shown in FIGS. 1 and 5 to the upwardly extending inflated shape (extended away from floor 122) shown in FIG. 2 in response to an increase in pressure in interior chamber 18 of package 10. It is within the scope of this disclosure to configure membrane sheet 52 to have a flat shape or an upwardly bowed pre-expansion shape.

Sheet-support ring 50 provides a lid-ring frame for the multi-layer membrane sheet 52. In an illustrative embodiment, sheet-support ring 50 is configured to mate temporarily in snapping relation with a portion of container brim 16 overlying an outwardly extending undercut space formed in container 12 so that container lid 14 is removable and reclosable.

In a container-filling process in accordance with the present disclosure, a product 20 (e.g., food) is deposited into interior product-storage region 32 formed in vessel 30. Then lid 14 is mounted on container 12 to close an opening 33 into product-storage region 32 as suggested in FIG. 6 and to cause peelable and resealable sealant layer established by an inner bed in membrane sheet 52 to mate with brim 16 of container 12 as suggested in FIG. 8. Then, for example, the peelable and resealable sealant layer established by the inner bed of membrane sheet 52 is welded to container brim 16 using heat applied to the inner bed through an outer bed and a core of membrane sheet 52 or other suitable means. It is within the scope of the present disclosure to couple the inner bed of membrane sheet 52 to container brim 16 through heat applied by conduction or transmission of ultrasonic or electromagnetic energy.

In illustrative embodiments, sheet-support ring 50 has an endless (e.g., round, ring-shaped, square, oblong, etc.) edge shaped to mate with a companion container 12. Sheet-support ring 50 may be thermoformed or otherwise molded of a suitable plastics material. Suitable materials include polypropylene (PP) or high-density polyethylene (HDPE). Sheet-support ring 50 may also be made of polyethylene terephthalate (PET) or crystallized polyethylene terephthalate (CPET) to improve barrier properties. Sheet-support ring 50 may also be made using a coextruded material with barrier polymers such as EVOH or PVdC in a center layer.

In illustrative embodiments, multi-layer membrane sheet 52 can be produced using a coextruded film or sheet product comprising, for example, PP or HDPE. Membrane sheet 52 may also include one or more barrier layers such as EVHO, NYLON, or PVdC, tie layers, and a sealant layer. The sealant layer may comprise metalized LDPE or LLDPE, PP-based sealant, blends of PP and polybutane, as well as EMA- and EVA-based sealants.

Membrane sheet 52 is flexible and configured to move, deform, and conform in response to changes in pressure extant in the sealed interior chamber 18 formed in package 10. Membrane sheet 52 is peelable to facilitate disengagement from container brim 16 during removal of lid 14 from container 12.

An illustrative process for forming container 12 is shown in FIGS. 10-14. As an example, the process for forming container 12 is a molding process. A molding machine 60 includes a female mold 61, a companion male mold 62, and a core dispenser 64 as shown in FIGS. 11-14.

Figure 10:
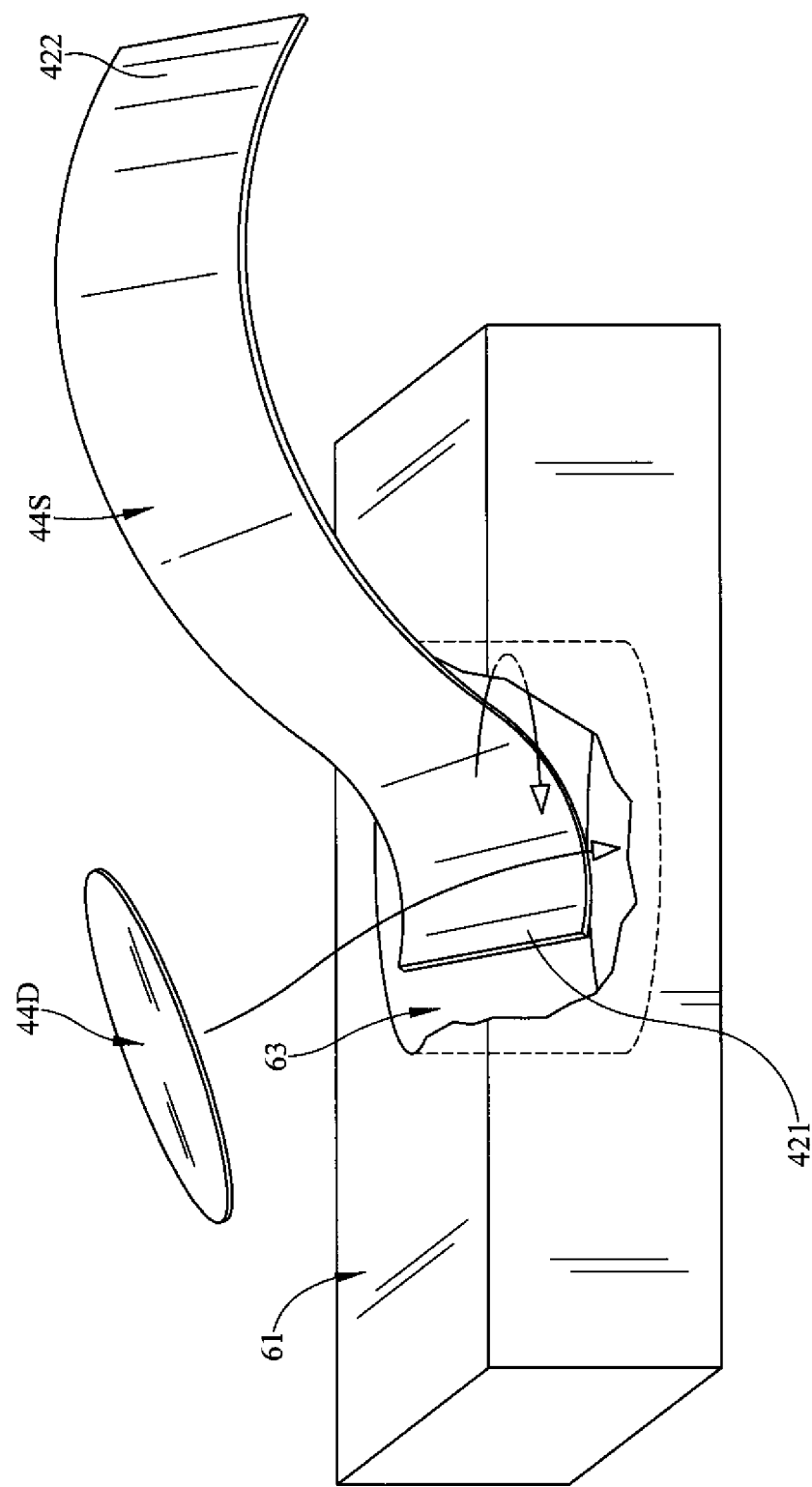

In an initial stage of molding, strip 42S and disk 44D are placed in female mold 61 as shown in FIG. 10. Male mold 62 moves toward and engages female mold 61 to form mold cavity 63 therebetween and strip 42S and disk 44D lie therein as shown in FIG. 13.

In a subsequent stage of molding, core dispenser 64 injects molten plastics material 65 through male mold 62 and into mold cavity 63 as shown in FIG. 13. As molten plastics material 65 fills mold cavity 63, strip 42S and disk 44D are coupled together to form exterior casing 40 which surrounds and is coupled to vessel 30 which is produced when molten plastics materials 65 solidifies.

In a final stage of molding, molten plastics materials 65 solidifies to form vessel 30. Male mold 62 moves away from female mold 61 and completed container 12 is separated from female mold 61 as shown in FIG. 14.

In illustrative embodiments, the package 10 expands and contracts during pressure and temperature changes to allow the volume of an interior chamber 18 formed in package 10 to vary without bursting or damaging package 10. Portions of lid 14 and container 12 are made of expansible elastic materials that expand to assume an inflated shape without bursting or exceeding an elastic limit associated with the expansible elastic materials, for example, when moving on a conveyor through a hot oven (e.g., retort or autoclave machine) to sterilize food stored in the package 10 and that contract when cooled to assume an original pre-expansion shape. The windows 35 formed in side panel 36 of vessel 30 and the apertures 37 formed in bottom panel 38 of vessel 30 are illustratively configured to influence the inflated shape of container 12 when container 12 moves through the hot oven.

In illustrative embodiments, container 12 includes an expansible side wall 121 configured to inflate and move outwardly relative to a longitudinal axis of the container 12 to increase the volume of the interior product-storage region 32, for example, when the package 10 is heated in an oven and the pressure in the interior increases as suggested in FIGS. 1 and 2. The expansible side wall 121 is elastic and configured to contract when cooled to assume an original pre-expansion shape as suggested in FIG. 3.

In illustrative embodiments, container 12 includes an expansible floor 122 configured to inflate and move downwardly relative to lid 14 to increase the volume of the interior product-storage region 32 when, for example, the package 10 is heated in an oven and the pressure in the interior increases as suggested in FIGS. 1 and 2. The expansible floor 122 is elastic and configured to contract when cooled to assume an original pre-expansion shape as suggested in FIG. 3.

In illustrative embodiments, lid 14 comprises an expansible membrane sheet 52 mounted on a sheet-support ring 50. Sheet-support ring 50 is configured to mate temporarily with brim 16 of container 12 to retain expansible membrane sheet 52 in mating and sealing engagement with container brim 16. Expansible membrane sheet 52 is made of a pliable elastic material and is configured to inflate and move upwardly relative to sheet-support ring 50 away from bottom panel 44 of vessel 30 to increase the volume of the interior chamber 18 when, for example, package 10 is heated in an oven and the pressure in the interior increases. Expansible membrane sheet 52 is elastic and configured to contract when cooled to assume an original pre-expansion shape.

Figure 15:
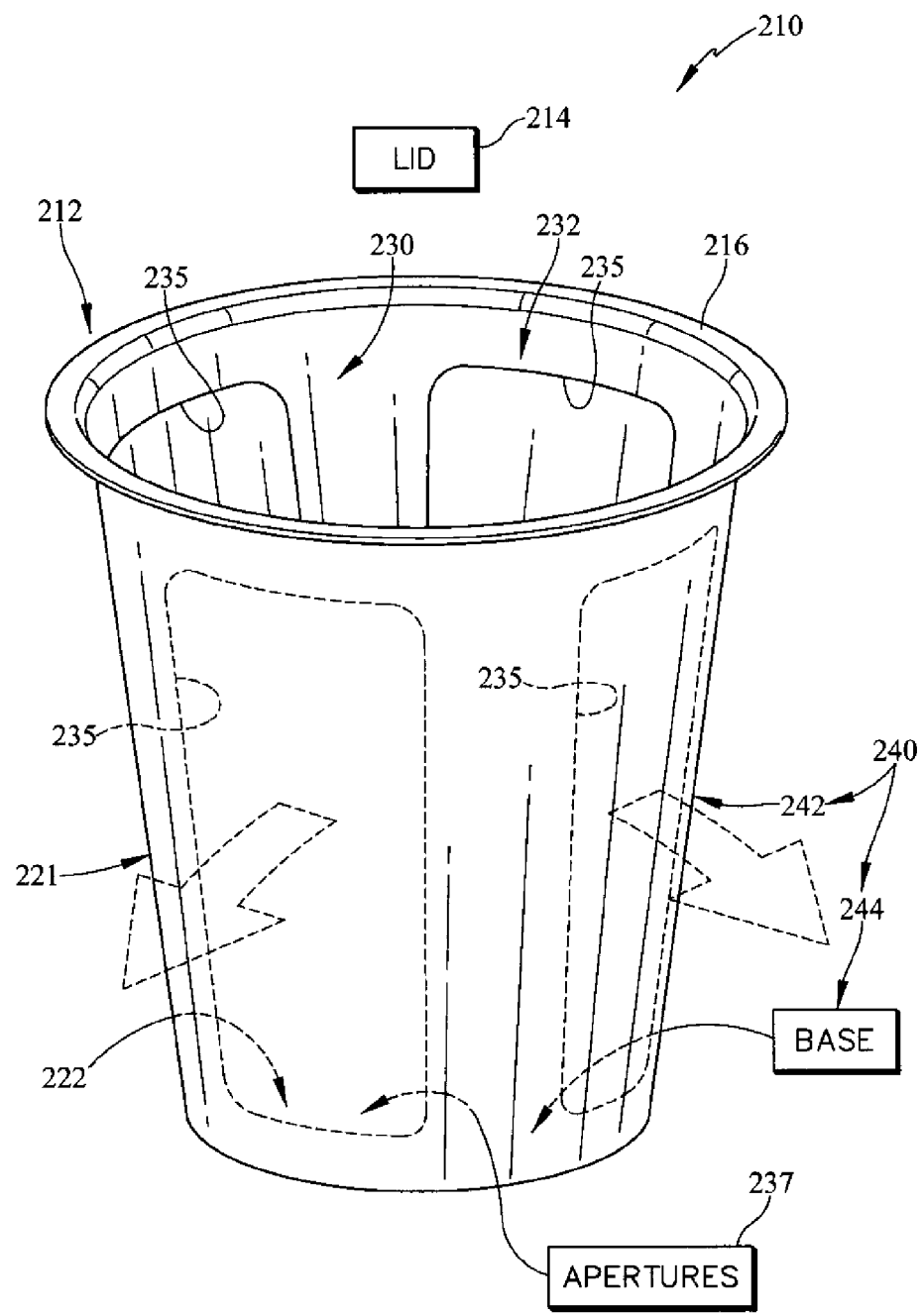
FIG. 15 is a perspective view of an alternative container adapted for use with a lid to form an alternative package showing that the alternative container includes a vessel with a side panel formed to include windows and showing that the container includes an exterior casing encasing the vessel and covering the windows to form a side wall that expands without bursting to accommodate increasing volume of food stored in the container during heating of the container when the container is filled and closed by a lid.

In another embodiment shown in FIG. 15, a container 212 is provided for mating with a suitable lid 214 to provide a package 210 in accordance with the present disclosure. Container 212 includes a vessel 230 and an exterior casing 240.

In illustrative embodiments, the vessel 230 is also formed to include side and bottom panels 221, 222 that cooperate to form an interior product-storage region 232 located below a brim 216. The interior product-storage region 232 of the container 212 is bounded by the vessel 230 and by sleeve and base portions 242, 244 of exterior casing 240 and is adapted for receiving and holding liquid and solid food until lid 214 is mounted on the container 212 to produce a package 210.

In illustrative embodiments, the side panel 221 of the vessel 230 is formed to include windows 235 that extend through the side panel 221 to open into the interior product-storage region 232. A sleeve 242 of exterior casing 240 covers the windows 235 formed in the side panel 221 of vessel 230. The sleeve 242 of the exterior casing 240 can expand and contract without bursting when exposed (via the side-panel windows 235) to high temperatures and pressures.

In illustrative embodiments, bottom panel 222 of vessel 230 is illustratively formed to include a plurality of apertures 237 arranged in a predetermined pattern that extend through the bottom panel 222 to open into the interior product-storage region 232. The base 242 of exterior casing 240 covers the plurality of apertures 237 formed in bottom panel 222 of vessel 230. Base 244 of the exterior casing 240 can also expand and contract without bursting when exposed to high temperatures and pressures.

Figure 16:
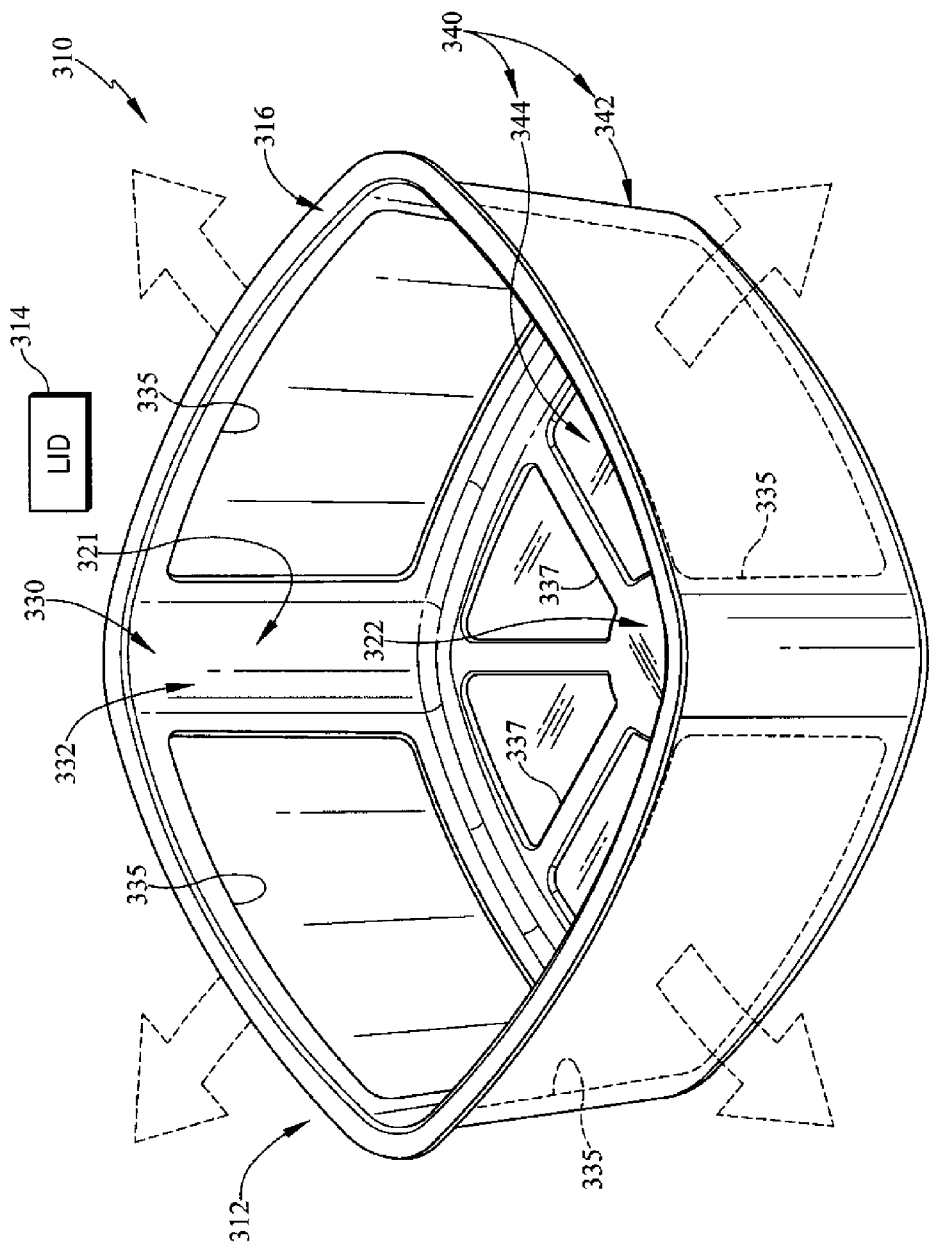
FIG. 16 is a perspective view of another container adapted for use in a package in accordance with the present disclosure.

In another embodiment shown in FIG. 16, a container 312 is provided for mating with a suitable lid 314 to provide a package 310 in accordance with the present disclosure. Container 312 includes a vessel 330 and an exterior casing 340.

In illustrative embodiments, vessel 330 is also formed to include side and bottom panels 321, 322 that cooperate to form an interior product-storage region 332 located below a brim 316. The interior product-storage region 332 of container 312 is bounded by the vessel and by sleeve and base portions 342, 344 of the exterior casing 340 and is adapted for receiving and holding liquid and solid food until the lid 314 is mounted on the container 312 to produce a package 310.

In illustrative embodiments, side panel 321 of vessel 330 is formed to include windows 335 that extend through side panel 321 to open into the interior product-storage region 332. A sleeve 342 of exterior casing 340 covers the windows 335 formed in side panel 321 of vessel 330. The sleeve 342 of exterior casing 340 can expand and contract without bursting when exposed (via the side-panel windows 335) to high temperatures and pressures.

In illustrative embodiments, the bottom panel 332 of vessel 330 is illustratively formed to include a plurality of apertures 337 arranged in a predetermined pattern that extend through the bottom panel 322 to open into the interior product-storage region 332. The base 344 of exterior casing 340 covers the plurality of apertures 337 formed in the bottom panel 322 of the vessel 330. The base 344 of the exterior casing 340 can also expand and contract without bursting when exposed to high temperatures and pressures.

Figure 17:
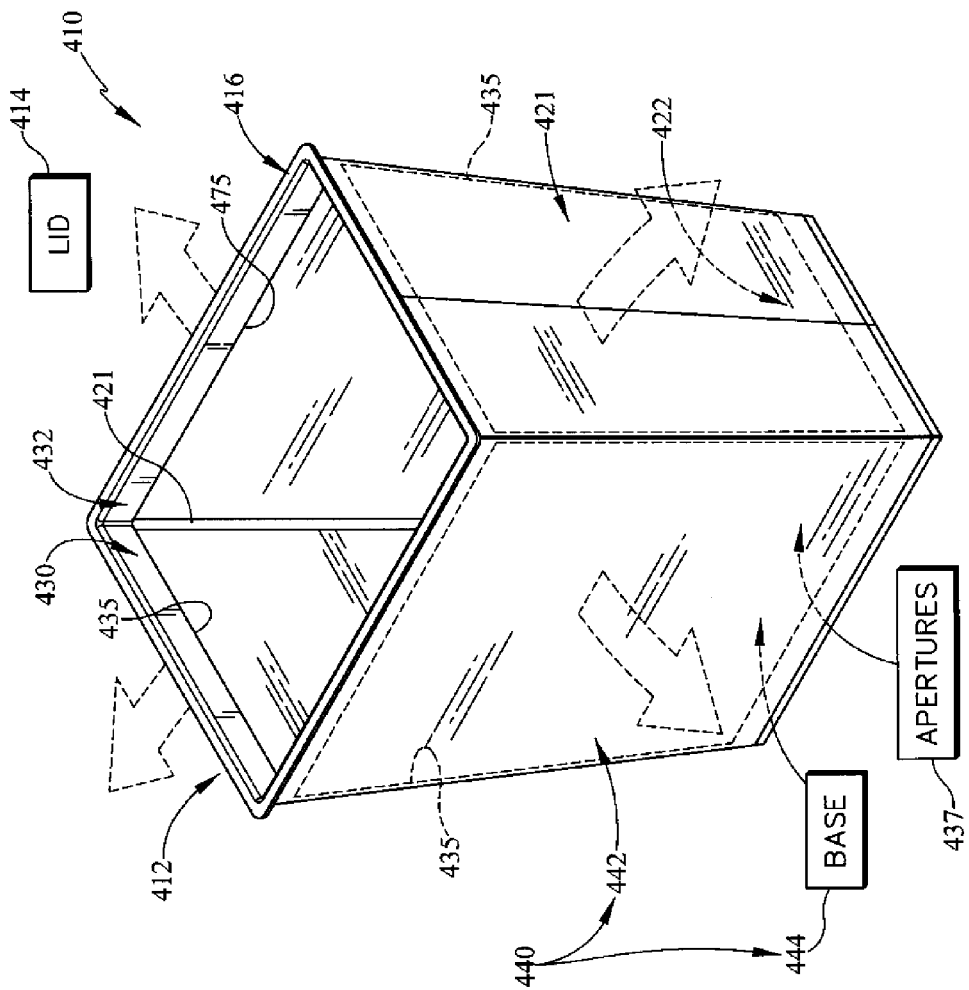
FIG. 17 is a perspective view of yet another container adapted for use in a package in accordance with the present disclosure.

In another embodiment shown in FIG. 17, a container 412 is provided for mating with a suitable lid 414 to provide a package 410 in accordance with the present disclosure. Container 412 includes a vessel 430 and an exterior casing 440.

In illustrative embodiments, the vessel 430 is also formed to include side and bottom panels 421, 422 that cooperate to form an interior product-storage region 432 located below a brim 416. The interior product-storage region 432 of the container 412 is bounded by vessel 430 and by sleeve and base portions 442, 444 of exterior casing 440 and is adapted for receiving and holding liquid and solid food until the lid 414 is mounted on container 412 to produce a package 410.

In illustrative embodiments, the side panel 421 of vessel 430 is formed to include windows 435 that extend through the side panel 421 to open into the interior product-storage region 432. A sleeve 442 of exterior casing 440 covers the windows 435 formed in side panel 421 of vessel 430. Sleeve 442 of exterior casing 440 can expand and contract without bursting when exposed (via the side-panel windows 435) to high temperatures and pressures.

In illustrative embodiments, bottom panel 422 of vessel 430 is illustratively formed to include a plurality of apertures 437 arranged in a predetermined pattern that extend through the bottom panel 422 to open into the interior product-storage region 432. Base 444 of exterior casing 440 covers the plurality of apertures 437 formed in bottom panel 422 of vessel 430. Base 444 of exterior casing 440 can also expand and contract without bursting when exposed to high temperatures and pressures.

Figure 18:
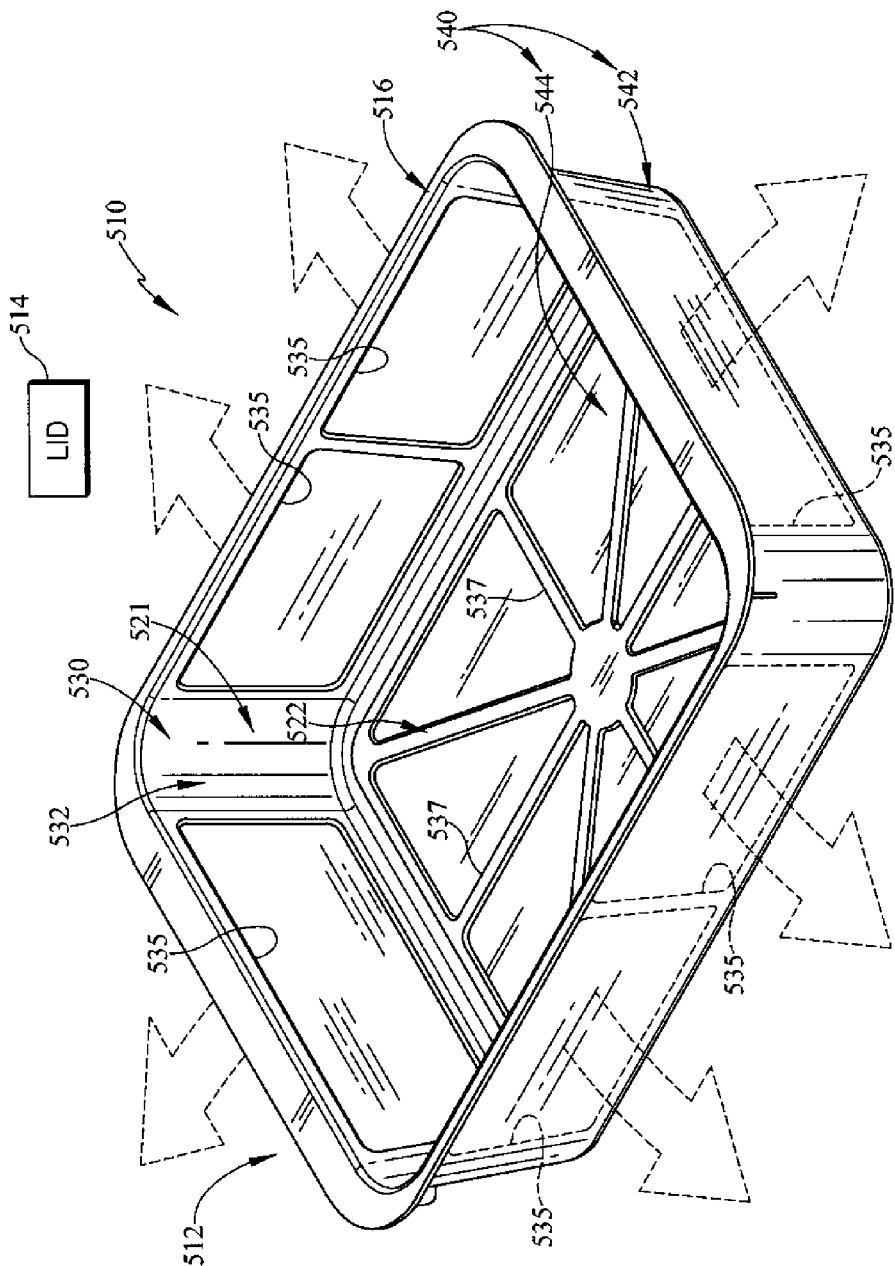
FIG. 18 is a perspective view of still another container adapted for use in a package in accordance with the present disclosure.

In another embodiment shown in FIG. 18, a container 512 is provided for mating with a suitable lid 514 to provide a package 510 in accordance with the present disclosure. Container 512 includes a vessel 530 and an exterior casing 540.

In illustrative embodiments, vessel 530 is also formed to include side and bottom panels 521, 522 that cooperate to form an interior product-storage region 532 located below a brim 516. Interior product-storage region 532 of container 512 is bounded by vessel 530 and by the sleeve and base portions 542, 544 of exterior casing 540 and is adapted for receiving and holding liquid and solid food until lid 514 is mounted on container 512 to produce a package 510.

In illustrative embodiments, side panel 521 of vessel 530 is formed to include windows 535 that extend through side panel 521 to open into interior product-storage region 532. Sleeve 542 of exterior casing 540 covers the windows 535 formed in side panel 521 of vessel 530. Sleeve 542 of exterior casing 540 can expand and contract without bursting when exposed (via the side-panel windows 535) to high temperatures and pressures.

In illustrative embodiments, the bottom panel 522 of the vessel is illustratively formed to include a plurality of apertures 537 arranged in a predetermined pattern that extend through the bottom panel 522 to open into the interior product-storage region 532. Base 544 of exterior casing 540 covers the plurality of apertures 537 formed in bottom panel 522 of vessel 530. Base of the exterior casing 540 can also expand and contract without bursting when exposed to high temperatures and pressures.

The invention claimed is:

1. A package comprising
a vessel including a bottom panel, a side panel arranged to extend upwardly from the bottom panel and cooperate with the bottom panel to form a product-storage region, the side panel being formed to include at least one window that extends through the side panel and opens into the product-storage region, and a brim coupled to the side panel and arranged to border an opening into the product-storage region,
an exterior casing made of an expansible elastic material and configured to include a sleeve arranged to surround and mate with an exterior surface of the side panel of the vessel and to cover the at least one window, and
a lid adapted to mate with the brim of the vessel to close the opening into the product-storage region to form a retortable package and establish a variable-volume interior chamber therein, wherein the sleeve of the exterior casing is made of an elastic deformable material is configured to provide means for yielding elastically during exposure of an inner surface of the sleeve to an elevated pressure in excess of a predetermined retort pressure that is extant in the variable-volume interior chamber when the lid is sealed hermetically to the brim of the vessel to cause shape-changing movement of the sleeve from a selected pre-expansion shape in a direction away from the product-storage region of the vessel and a vertical central axis of the vessel to an outwardly extending inflated shape to cause the variable-volume interior chamber to increase in volume without any discharge of fluid from the variable-volume interior chamber to surroundings outside of the variable-volume interior chamber and then contracting to assume a contracted shape in response to cooling of the variable-volume interior chamber.

2. The package of claim 1, wherein the brim is endless to extend around the vertical central axis of the vessel and arranged to lie in spaced-apart relation to the floor and the side panel is formed to include a series of windows arranged to lie in spaced-apart relation to one another about the vertical central axis of the vessel.

3. The package of claim 2, wherein the sleeve of the exterior casing is configured to provide means for providing an oxygen-barrier shield to block flow of oxygen from the surroundings outside the vessel into the product-storage region through the side panel of the vessel.

4. The package of claim 2, wherein the sleeve of the exterior casing is made of an expansible elastic material and is configured to move from a pre-expansion shape to an inflated shape extending outwardly away from the vertical central axis with relatively greater outwardly extending bulges corresponding to each of the windows in response to an increase in pressure in the variable-volume interior chamber.

5. The package of claim 1, wherein the exterior casing is made of a stretchable film.

6. The package of claim 1, wherein the exterior casing further includes a base coupled to a lower end of the sleeve and arranged to mate with an exterior surface of the bottom panel of the vessel.

7. The package of claim 6, wherein the bottom panel of the vessel is formed to include a plurality of apertures that extend through the bottom panel and open into the product-storage region and the base of the exterior casing covers the apertures formed in the bottom panel of the vessel.

8. The package of claim 7, wherein the sleeve and base of the exterior casing cooperate with the side and bottom panels of the vessel to provide means for receiving and holding liquid and solid materials.

9. The package of claim 6, wherein the base and the sleeve cooperate to form a monolithic exterior casing.

10. The package of claim 9, wherein the bottom panel of the vessel is formed to include a plurality of apertures that extend through the bottom panel and open into the product-storage region and the base of the exterior casing covers the apertures formed in the bottom panel of the vessel.

11. The package of claim 1, wherein the bottom panel of the vessel is made of an elastic deformable material and is configured to provide floor means for yielding elastically during exposure of an inner surface of the bottom panel of the vessel to an elevated pressure in excess of a predetermined pressure that is extant in the variable-volume interior chamber when the lid is hermetically sealed to the brim of the vessel to cause shape-changing movement of the bottom panel of the vessel from a selected pre-expansion shape in a direction away from the lid to an outwardly extending inflated shape to cause the variable-volume interior chamber to increase in volume without any discharge of fluid from the variable-volume interior chamber to surroundings outside the variable-volume interior chamber and then contracting to assume a contracted shape in response to cooling of the variable-volume interior chamber.

12. The package of claim 11, wherein the bottom panel of the vessel is bowed inwardly toward the lid when moved to assume the selected pre-expansion shape of the bottom panel.

13. The package of claim 11, wherein the base of the exterior casing is coupled to a lower end of the sleeve and arranged to mate with an underside of the bottom panel of the vessel and move with the bottom panel during shape-changing movement of the bottom panel relative to the side panel.

14. The package of claim 13, wherein the base and the sleeve cooperate with the sleeve and the vessel to provide means for holding a liquid in the product-storage region.

15. The package of claim 13, wherein the exterior casing is configured to provide means for providing a support web on exterior surfaces of the side and bottom panels to rigidify the vessel to allow each of side and bottom panels of the vessel to be made of thin non-rigid materials yet allow shape-changing movement of the bottom panel among the selected pre-expansion, outwardly extending inflated, and contracted shapes.

16. The package of claim 13, wherein the exterior casing is configured to provide means for providing an oxygen-barrier shield to block flow of oxygen from the surroundings into the interior product-storage region through the side and bottom panels of the vessel.

17. A package comprising
a container including a vessel formed to include a product-storage region and a casing made of an expansible elastic material and coupled to the vessel to lie in a position exposed to temperature and pressure extant in the product-storage region, the vessel and casing being joined by molding, and
a lid coupled to a brim of the container to close an aperture opening into the product-storage region and form a variable-volume interior chamber between the container and the lid, wherein the casing is mounted for movement relative to the vessel without bursting to increase volume of the variable-volume interior chamber in response to an increase in pressure in the variable-volume interior chamber during exposure of the package to elevated temperatures in an oven during a retort process, wherein the vessel includes a bottom panel arranged to lie in spaced-apart relation to the brim and a side panel arranged to interconnect the brim and the bottom panel and formed to include a window arranged to extend through the side panel and open into the product-storage region and wherein the casing is arranged to cover the window to allow movement of portions of the casing relative to the side panel during a change in pressure in the variable-volume interior chamber.

18. The package of claim 17, wherein the casing includes a sleeve arranged to lie alongside the side panel of the vessel to cover the window and a base coupled to a lower end of the sleeve to lie alongside the bottom panel of the vessel.

19. The package of claim 18, wherein the sleeve and the base cooperate to form a monolithic casing.

20. A package comprising
a vessel including a bottom panel, a side panel arranged to extend upwardly from the bottom panel and cooperate with the bottom panel to form a product-storage region, the side panel being formed to include at least one window that extends through the side panel and opens into the product-storage region, and a brim coupled to the side panel and arranged to border an opening into the product-storage region,
an exterior casing made of an expansible elastic material and configured to include a sleeve arranged to surround and mate with an exterior surface of the side panel of the vessel and to cover the at least one window, and
a lid adapted to mate with the brim of the vessel to close the opening into the product-storage region to form the retortable package and establish a variable-volume interior chamber therein, wherein the sleeve of the exterior casing is made of an elastic deformable material and is configured to provide means for yielding elastically during exposure of an inner surface of the sleeve to an elevated pressure in excess of a predetermined pressure that is extant in the variable-volume interior chamber when the lid is sealed hermetically to the brim of the vessel and the vessel and lid are subjected to elevated retort temperatures to sterilize any product contained in the variable-volume interior chamber to cause shape-changing movement of the sleeve from a selected pre-expansion shape in a direction away from the product-storage region of the vessel and a vertical central axis of the vessel to an outwardly extending inflated shape to cause the variable-volume interior chamber to increase in volume without any discharge of fluid from the variable-volume interior chamber to surroundings outside of the variable-volume interior chamber and then contracting to assume a contracted shape in response to cooling of the variable-volume interior chamber.

21. The package of claim 20, wherein the bottom panel of the vessel is made of an elastic deformable material and is configured to provide floor means for yielding elastically during exposure of an inner surface of the bottom panel of the vessel to an elevated pressure in excess of a predetermined pressure that is extant in the variable-volume interior chamber when the lid is hermetically sealed to the brim of the vessel and the vessel and lid are subjected to elevated retort temperatures to sterilize any product contained in the variable-volume interior chamber to cause shape-changing movement of the bottom panel of the vessel from a selected pre-expansion shape in a direction away from the lid to an outwardly extending inflated shape to cause the variable-volume interior chamber to increase in volume without any discharge of fluid from the variable-volume interior chamber to surroundings outside the variable-volume interior chamber and then contracting to assume a contracted shape in response to cooling of the variable-volume interior chamber.

* * * * *